United States Patent [19]
Reid et al.

[11] 4,162,861
[45] Jul. 31, 1979

[54] STRUCTURAL JOINT

[75] Inventors: Robert Reid, Willowdale; Kaljo Lustvee, Islington, both of Canada

[73] Assignee: Daymond Limited, Mississauga, Canada

[21] Appl. No.: 867,289

[22] Filed: Jan. 5, 1978

[51] Int. Cl.$^2$ ............... B25G 3/00; F16B 7/00; F16B 12/08; F16L 41/00
[52] U.S. Cl. ................................ 403/242; 182/228
[58] Field of Search ............ 403/242, 245, 263, 282, 403/230, 231; 182/228; 29/514

[56] References Cited
U.S. PATENT DOCUMENTS

| | | | |
|---|---|---|---|
| 3,854,185 | 12/1974 | Reid | 403/242 X |
| 3,970,400 | 7/1976 | Reid | 403/242 |

*Primary Examiner*—Wayne L. Shedd

[57] ABSTRACT

A structural joint for joining two elements comprises a malleable deformable flange on the first element and an elongate arcuate recess in the second element. The recess is adapted to receive the flange and allow the flange to be deformed therein into at least a portion of a coil where the entrance to the recess is less than the size of the formed coil. The recess is characterized in having a leg, the extremity of which defines one side of the recesses' entrance. The flange has next to it a tongue portion where a gap defined between the flange and tongue portion is of a size adapted to receive the leg of the recess in a manner to provide an interference fit between the tongue portion and the leg. The leg of the recess has an overturned part which overlies a portion of the coiled flange and has an abutment which abuts a side of the tongue portion. A method for making such structural joint is disclosed.

4 Claims, 8 Drawing Figures

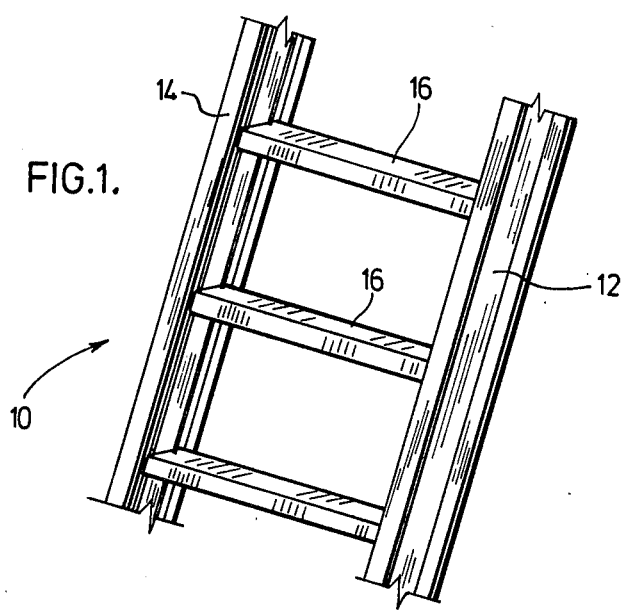
FIG.1.
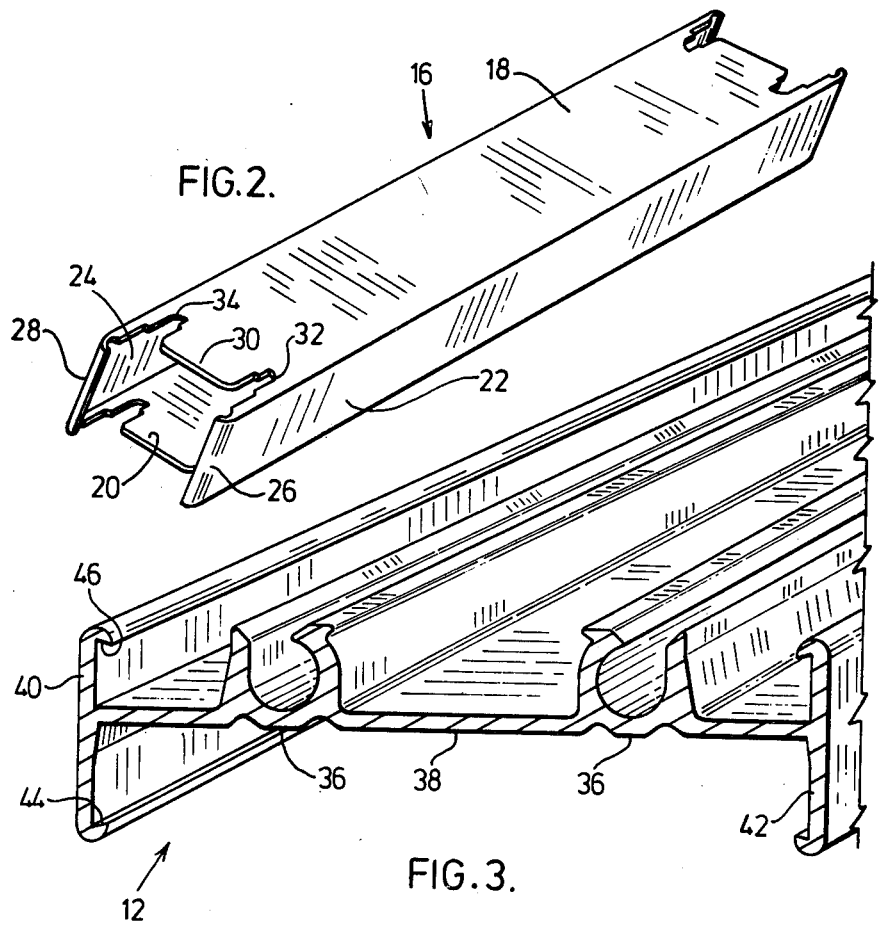
FIG.2.
FIG.3.

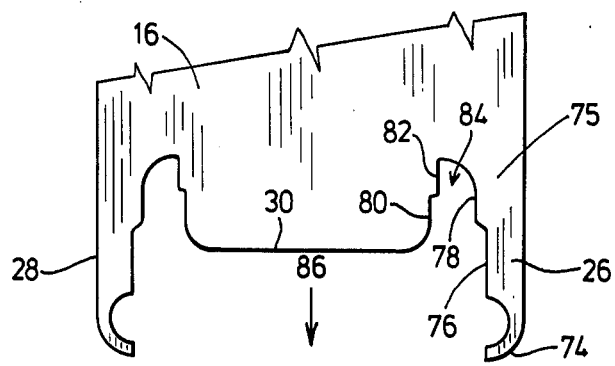
FIG.6.
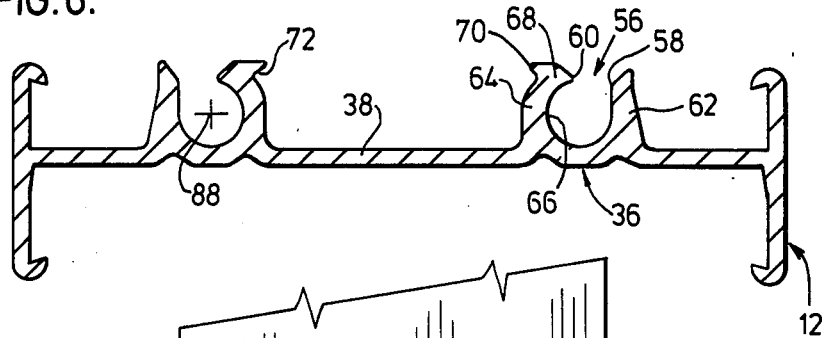
FIG.7.
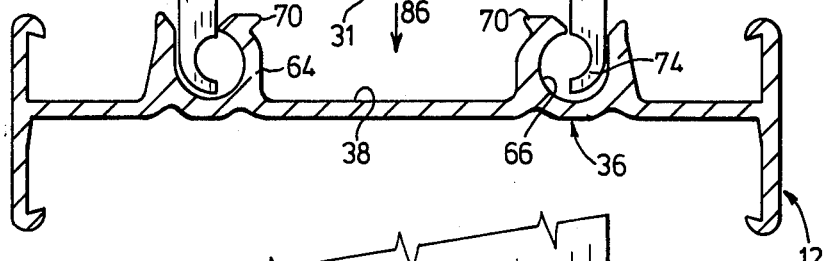
FIG.8.
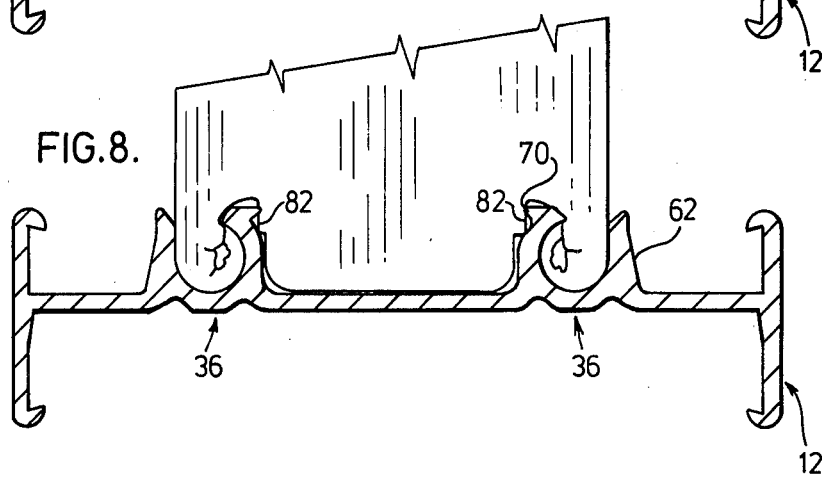

STRUCTURAL JOINT

FIELD OF THE INVENTION

This invention relates to structural joints for joining two elements.

BACKGROUND OF THE INVENTION

Joints between elements which can be formed by pressing operations are desirable because they eliminate the need for welding or riveting and due to their ability to be pressed, provide for economy in manufacture. Elements which may be joined together by pressing are such as that disclosed in U.S. Pat. No. 3,854,185. In that type of joint a flange on a first element is deformed in a groove of a second element to form at least a portion of a coil. The opening in the groove is less than the width of the coil, thereby joining the elements by precluding removal of the flange from the groove.

The structural joint according to this invention is formed by a pressing operation and has enhanced resistance to joint separation caused by torsional and pull-out forces.

SUMMARY OF THE INVENTION

The structural joint may be used to join various types of elements together. The first and second elements to be joined each comprises a component of the joint which on assembly provides the completed joint. The first element is provided with a flange of malleable and deformable material. The second element has a longitudinally extending recess which has an entrance opening defined by opposing recess edges. The recess is adapted to receive therein the flange and to provide for deformation of the flange within the recess in a manner which forms at least a portion of a coil therein. The width of the recess entrance is less than the size of the formed coil. The recesses' entrance is adapted to permit entry of the flange along a path offset from the longitudinal central axis of the recess. The recess is characterized in having a leg means which defines at least an upper part of the recesses' internal surface. The extremity of the leg means defines an edge of the recess opening. The first element which includes the flange, has a tongue portion next to the flange. A gap is defined between the flange and the tongue portion and is of a configuration adapted to receive the leg means of the second element. The leg means includes an overturned portion which overlies a portion of the coiled flange. The leg means extends away from the overturned portion to provide an abutment which abuts the side of the tongue portion upon complete assembly of the joint. On attempted joint separation the combination of the coiled flange with the abutment portion and the tongue portion in clamping the leg means increase resistance to joint failure.

According to an aspect of the invention, the flange may increase in thickness towards its base along at least a portion of its height. The purpose of the thickened portion is to reinforce the flange to prevent undesirable buckling of the flange on pressing it into the groove and serves to increase outward binding forces that the coiled flange exerts on the recess interior surface.

The method according to this invention for forming the structural joint comprises forming on a first element a flange, a tongue portion and a gap between the flange and tongue portion, the gap being configured so as to receive the leg means of the recess. Formed on a second element is the longitudinally extending arcuate shaped recess where a portion of its wall includes the leg means, the extremity of which defines an edge of the opening into the recess. The entrance opening is adapted to permit entry of the flange along a path offset from the longitudinally extending axis of the recess. The elements are pressed together to deform the flange in the recess where the side of the tongue lies or presses against the leg of the recess to provide an interference fit between the tongue and the leg means.

DESCRIPTION OF THE DRAWINGS

These and other advantages and features of the invention will become apparent to those skilled in the art from the following detailed description of the preferred embodiments of the invention as used in ladders and as shown in the drawings wherein:

FIG. 1 is a view of a portion of the ladder having the ladder rungs secured to the ladder rails by a joint according to this invention;

FIG. 2 shows the ladder rung having its end shaped in a manner according to this invention;

FIG. 3 shows a section of the ladder rail having recesses;

FIGS. 6 through to 8 show a sequence of steps in connecting a ladder rung to a ladder rail using the joint according to this invention.

DETAILED DESCRIPTION OF THE PREFERRED EMBODIMENTS OF THE INVENTION

Figure 4:
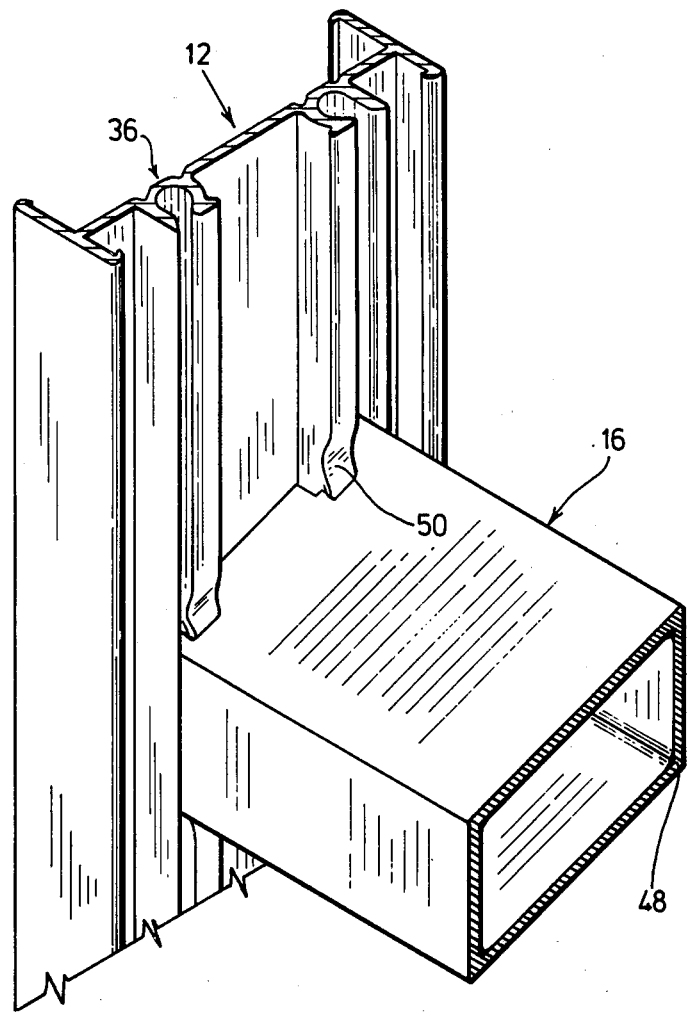
FIG. 4 shows a portion of a ladder with the rung secured to the rail.

The structural joint according to this invention may be used in various ways to join a first element to a second element. For example, it can be used in joining column sections together along their length, fabricating electrical cable trays, appliance manufacturing, etc. The element which has the recess portion is made from a rigid material which is preferably metal. The flange portion is made of malleable deformable material, preferably a metal such as an aluminum alloy and the tongue portion is of a rigid material. The recess and flange of the elements may be curved along their length so that when they are joined, the connected elements are joined along a curved connection. This is particularly useful in making joints at rounded corners of objects. According to a preferred embodiment of the invention, the joint is particularly suitable for use in joining aluminum alloy ladder rungs to aluminum alloy ladder rails. As normally found in other ladders, weakening holes or rivet connections are made in the rails to provide for connection of the rungs to the rails. This weakening of the rails is eliminated by this invention. Turning to FIG. 1 a portion of a ladder 10 has ladder rails 12 and 14 and interspaced therebetween and affixed thereto are a plurality of ladder rungs 16. The ends of the box-shaped ladder rungs are modified in the manner shown in FIG. 2. The rung has a top 18, an opposing bottom 20 with opposing sidewalls 22 and 24. Each end of the rung is die-cut to the configuration shown to provide two outwardly extending flanges 26 and 28 with an intermediate tongue 30 spaced from the flanges by mirror-image identical gaps 32 and 34.

The rail 12 of FIG. 3, has along its length two recesses, grooves or channels 36 provided on base plate 38. Each edge of the rail base plate 38 has perpendicularly disposed flange portions 40 and 42. The rung flanges 26 and 28 of each rung end are pressed into recesses 36 to connect the rung to the rail. The flanges of the rails are specially adapted to provide inturned edges 44 and 46 which interlock with one another to provide an extension ladder in the manner taught in the aforementioned U.S. Pat. No. 3,854,185.

The ladder rung 16 and rails 12 and 14 may be extruded from metal such as various types of well known aluminum alloys. The extruded rung member is cut to particular lengths and the so formed rungs have their ends die-cut. The extruded rail member is cut to the desired length for the ladder. It is therefore apparent that this type of joint readily lends itself to fabrication of its components on the ladder rung and rails in an economical manner.

FIG. 4 shows the completed assembly of a ladder rung 16 connected to the rail 12. The section of the rung 16 shows that the corner portions 48 are reinforced by additional material. This adds strength to the flanges to assist in preventing undesirable buckling (i.e. over the outside portions of the recesses) during coiling of the flanges in the recesses. Provided above and below each rung 16 are detents 50 which decrease the size of the recesses 36 to resist torsional or twisting movement in the rung 16 relative to the rail 12. This arrangement is particularly useful in extension ladders where they are subjected to twisting moments. It has been found that by incorporating these detents, resistance to joint separation caused by torsional forces can be increased by 200% or more. It is preferable to form the detents with a rounded die so as not to break or crack the metal of the recess walls. As shown the detents may be punched on the inner legs of the recesses 36 to constrict their cross-section. The material is preferably moved so as to press against the flanges to provide a secure connection.

Figure 5:
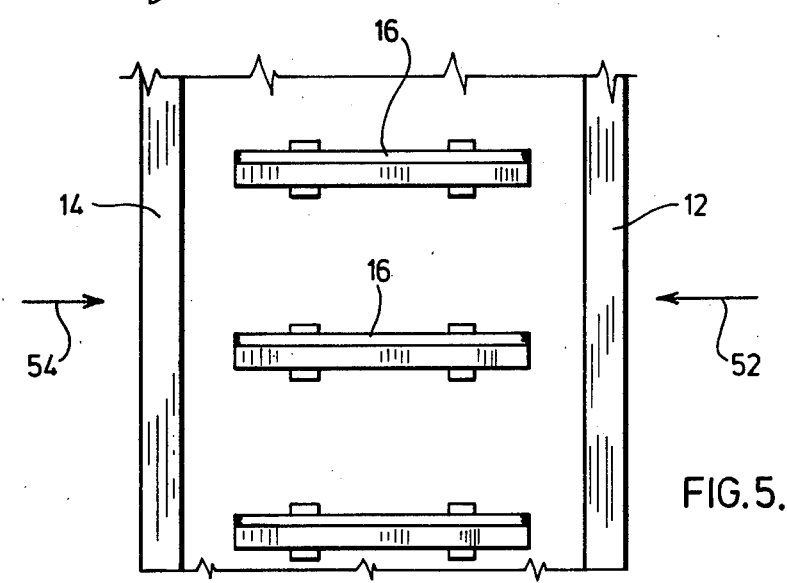
FIG. 5 shows a plurality of rungs located between two opposing rails preparatory to ladder assembly.

FIG. 5 of the drawings shows a plurality of rungs 16 located between rails 12 and 14. According to the method of this invention, the flanges on the rungs 16 are aligned with the recesses 36 on the rails and the opposing rails 12 and 14 are moved towards each other in the directions of arrows 52 and 54 to connect the ladder rungs to the ladder rails in a one-step operation. Due to this type of joint, the ladder may be tapered from bottom to top because the degree of coiling of the flange within the groove may be varied along its height. Such a feature is useful in making tapered step ladders.

Referring to FIGS. 6 to 8, the structure of the joint and its formation with respect to joining ladder rung to ladder rails will be discussed. Each of the rail recesses 36 has a longitudinally extending entrance opening designated by arrow 56. The entrance is defined by the edges 58 and 60 of the legs 62 and 64 of the recess. As shown the internal surface 66 of the recess is arcuate. The leg 64 has an overturned portion 68, the extremity of which provides edge 60. Extending away from edge 60, is a lug 70. The lug projects outwardly to the extent that it is parallel with the side of leg 64. Beneath the lug 70 is a groove 72.

The flanges 26 and 28 of the rung ends are integral with sidewalls 22 and 24 and are provided with rounded outer ends 74. The thickness of each flange end is substantially identical to the thickness of the corresponding side wall. It is understood, that in die-cutting the rung end, portion 74 is straight. A subsequent process step rounds the flange ends. In this particular embodiment of the invention, the upper and lower parts of the flange thicken towards its base 75. The end 74 is integral with a widened portion 76 which preceeds to a wider portion 78. Due to the structure of the rung, the widened portions 76 and 78 at the top and bottom of the flange are constituted by the top and bottom rung walls 18 and 20. The tongue 30 has sides 80 which are stepped to wider portions 82. The sides 80, 82 of tongue 30 and flange portion 78 which is separated from tongue 30 by gap 84, are so proportioned to provide an interference fit with leg 64 and particularly between portion 82 and lug 70.

In forming the joint the rung 16 and rail 12 are moved relatively towards to each other as represented by arrow 86. The flange ends 74 are so spaced apart as to be properly received by the recesses 36 in the manner shown in FIG. 7 where the flanges 74 enter the recesses 36 through the entrance 56 along a path offset from the longitudinal axis 88. The rounded ends 74 of the flanges provide a smooth start-up in deforming the flange within the recesses to form at least a portion of a coil. The flange end 74 follows the curvature of internal surface 66 as the flange folds. The widened portions 76 and 78 which defined a U-shaped channel flange portion which in combination with the thickened corners 48 substantially enhance the flanges' structural characteristics. This resists buckling of the flanges laterally of the recesses yet permits a coiling of the flange within the groove. The outer legs 62 have a thickened base portion to enhance their strength in resisting sideways deflection during joint formation.

The distance between surfaces 80 and 82 of the tongue are slightly greater than the distance between the outer surfaces of opposing legs 64. In this embodiment, the pressing operation results in a binding between the tongue sides 80 and 82 and the legs 64. Also the distance between opposing portions 78 is such to interfere with edges 60 of the recesses which also causes a binding action on the leg. In addition, the thickness of the flange in area 78 may be slightly greater than the width of the entrance 56. This binding action developed on both sides of the leg 64 in combination with a coiling of the flange in the recess provides a pinching or clamping action on the leg 64 of each recess 36 to substantially enhance the joints' strength.

Turning to FIG. 8, the completed joint is shown where pressure had been applied until the flanges were folded and partially coiled to the extent shown. The tongue 30 may be so configured that its end 31 upon abutting surface 38 acts as a stop to terminate the coiling of the flanges. The stop 31 on the tongue portion 30 is not necessary should the pressing equipment be set up to complete pressing of the flange within the groove to the extent shown in FIG. 8. The flange thickened portions 76 and 78 are bunched up within the recesses 36 to substantially fill them in the manner shown. This bunching up of the thickened portions substantially enhances the binding forces the coiled flange exerts on the recesses' internal surfaces 66 due to the inherent resiliency of the material in attempting to spring out. The overturned portions 68 on legs 64 overlie portions of the coiled flanges to preclude withdrawal of the flanges from the recesses because the entrances 56 are narrower than the width of the coiled flanges. The length of flange 26 may be such that the end 74 is forced into widened portions 78 during the latter portion of the pressing operation. This can cause the flange end 74 to indent the widened portions 78 and thereby increase the outward binding force the coiled flange exerts on the recess internal surface 66.

As mentioned this type of joint has enhanced resistance to separation caused by direct pull-out forces or torsional forces. Upon attempted pull-out of the rung 16 from the rail 12 the lug 70 is urged into the tongue 30 by the coiled portion of the flange interfering with the overturned portion 68. This causes the lug 70 to bite into the tongue where due to the rigidity of the tongue, the clamping action on the leg 64 is increased. As a result, the larger the pull-out force exerted on the rung, the larger the pinching or clamping action on the leg 64 to resist such pull-out until the materials fail. As exemplified by this discussion of a preferred embodiment, the joint has a built-in mechanism which increases resistance to joint separation as pull-out forces are increased. This is principally due to the provision of an abutment such as lug means 70 on the leg 64 of the recess which on attempted joint separation interferes with the tongue portion on the rung due to the mating configurations of the gap 84 and leg 64. This joint configuration also as mentioned has increased resistance to joint separation caused by torsional or twisting forces exerted on rung and rail.

Although the detailed description of a preferred use of the joint relates to joining a ladder rung to a ladder rail, it will be understood by those skilled in the art that the joint has several other applications in joining one element to another and variations may be made to such embodiments which would be apparent in making the joint without departing from the spirit of the invention or the scope of the appended claims.

I claim:

1. A structural joint formed upon joining two elements, said first element having a flange portion of malleable material, said second element having an elongate recess with an arcuate internal surface, the recess edges defining an elongate entrance to said recess where a leg defines at least an upper part of said recess internal surface, the extremity of said leg defining an edge of said recess, said first element having a rigid tongue portion spaced from said flange by a gap which is adapted to receive said leg on joing formation, said flange being deformed in said recess to form at least a portion of a coil therein which contacts the recesses' internal surface, said leg having an overturned portion which overlies a portion of said deformed flange to define a recess entrance smaller than the coiled flange, said leg having an abutment which abuts a longitudinally extending portion of a side of said tongue to clamp said leg between said tongue side and coiled flange, the arrangement being such that when a force is exerted to remove the coiled flange from the recess the clamping action on said leg is increased by virtue of said leg abutment interfering with and binding against said longitudinally extending side portion of said tongue.

2. A structural joint of claim 1 for joining a ladder rail to a ladder rung, said ladder rail having on one side two such spaced apart recesses with the leg means opposing one another, said rung having two such spaced apart flanges with the tongue portion common to and spaced from said flanges by such gaps, the spacing between said flanges and recesses being mutual so that said flanges are deformed in said recesses to join said rung to said rail.

3. A structural joint of claim 1 wherein the abutment portion comprises lug means which provides an interference fit with the adjacent side of said tongue.

4. A structural joint of claim 1 wherein at least part of said flange thickens towards its base to the extent that the thickened portion is slightly wider than said recess entrance to increase the binding clamping action on said leg.

* * * * *